Patented Aug. 5, 1924.

1,503,631

UNITED STATES PATENT OFFICE.

DONALD B. BRADNER AND MARY L. SHERRILL, OF BALTIMORE, MARYLAND.

PROCESS OF MAKING PUNGENT COMPOUNDS.

No Drawing. Application filed May 7, 1923. Serial No. 637,369.

To all whom it may concern:

Be it known that we, DONALD B. BRADNER and MARY L. SHERRILL, citizens of the United States, residing at Baltimore, Maryland, have invented certain new and useful Improvements in Processes of Making Pungent Compounds, of which the following is a specification.

This invention relates to a process of making pungent compounds and has more specific application to the preparation of capsaicin, which is the pungent principle of cayenne pepper.

These pungent compounds have been synthetically made heretofore by first preparing vanillyl amine

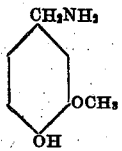

and then condensing the latter with an acid chloride of the general formula $C_nH_{2n\pm 1}COCl$ resulting in the formation of the pungent compound and HCl. In the general formula, $n$ has a value from 6 to 11.

The preparation of vanillyl amine is exceedingly difficult and expensive, as will readily appear by reference to the U. S. Patent 1,329,272 to E. K. Nelson.

Our process for producing these pungent compounds is not only cheap but is highly efficient and involves the use of readily procurable materials.

In preparing the pungent compounds according to our invention, guaiacol is condensed with a compound of the general formula $RCONHCH_2X$ wherein R is an alkyl radical containing from 6 to 11 carbon atoms and X represents a simple radical which combines with a hydrogen atom of the aromatic group of guaiacol to form a substance readily separable from the pungent product. Several methods may be employed for bringing about this reaction, among which may be mentioned the use of the Friedel-Crafts' synthesis in which case X represents a halogen in the general formula, and a suitable condensing agent is employed to bring about such synthesis.

We prefer, however, to carry out our process by employing an oxymethyl acylamide, where in the above general formula X represents a hydroxyl group, OH, and bringing about a reaction of the oxymethyl acylamide with guaiacol in the presence of a dehydrating agent. The oxymethal acylamide is first prepared by the action of formaldehyde on the acylamide in the presence of an alkaline condensing agent.

The general reactions are as follows:

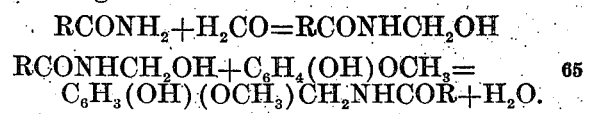

A specific example of carrying out our process is as follows: About 100 grams of undecenoyl amide, $C_{10}H_{19}CONH_2$, and 5.5 grams of barium hydroxide are mixed with 145 grams of a 40% formaldehyde solution. The temperature is raised to about 70° C., at which it is held for about 3 minutes and then allowed to cool slowly. The oxymethyl undecenoyl amide, $C_{10}H_{19}CONHCH_2OH$, is removed by filtration.

About 90 grams of the oxymethal undecenoyl amide and 50 grams of guaiacol are dissolved in about 650 cc. of absolute alcohol and 50 cc. of concentrated $H_2SO_4$ are added while the mixture is being cooled. The mass is allowed to stand for about 5 or 6 days at room temperature and then poured on ice. The pungent material is then extracted with a suitable organic liquid, such as $CHCl_3$, and the $CHCl_3$ solution is washed with dilute $Na_2CO_3$ solution. The pungent material is then recovered by distilling off the $CHCl_3$.

Our invention comprises the employment of any aliphatic acylamide containing 7 to 12 carbon atoms which may be employed in lieu of undecenoyl amide and also other dehydrating agents, for example, $ZnCl_2$, may be used instead of the $H_2SO_4$. Also, if sufficient dehydrating agent is employed ordinary alcohol may be used instead of absolute alcohol.

The acylamide may be prepared by treating the corresponding acid, for example undecylenic acid, with $PCl_3$ to form the acylamide chloride, which is then treated with $NH_4OH$ solution and the undecenoyl amide separated by filtration.

The present invention is not limited to the specific details set forth in the foregoing examples which should be construed as illustrative and not by way of limitation and in view of the numerous modifications which may be effected therein without departing from the spirit and scope of this invention, it is desired that only such limitstions be imposed as are indicated in the appended claims.

We claim as our invention:

1. In a process of making pungent compounds, reacting guaiacol with a compound of the formula $RCONHCH_2X$ wherein R is an alkyl radical containing from 6 to 11 carbon atoms and X represents a simple radical which combines with a hydrogen atom of the aromatic group of guaiacol to form a substance readily separable from the pungent product.

2. In a process of making pungent compounds, condensing guaiacol with a compound of the formula $RCONHCH_2X$ wherein R is an alkyl radical containing from 6 to 11 carbon atoms and X represents a simple radical which combines with a hydrogen atom of the aromatic group of guaiacol to form a substance readily separable from the pungent product.

3. In a process of making pungent compounds, reacting guaiacol with a compound of the formula $RCONHCH_2OH$ wherein R is an alkyl radical containing from 6 to 11 carbon atoms.

4. In a process of making pungent compounds, condensing guaiacol with a compound of the formula $RCONHCH_2OH$ wherein R is an alkyl radical containing from 6 to 11 carbon atoms.

5. In a process of making pungent compounds, treating guaiacol with a compound of the formula $RCONHCH_2OH$ wherein R is an alkyl radical containing from 6 to 11 carbon atoms and allowing the reaction to proceed in the presence of a dehydrating agent.

6. In a process of making pungent compounds, treating guaiacol with a compound of the formula $RCONHCH_2OH$ wherein R is an alkyl radical containing from 6 to 11 carbon atoms and allowing the reaction to proceed in the presence of concentrated $H_2SO_4$.

7. In a process of making pungent compounds adding a dehydrating agent to an alcoholic solution of guaiacol and a compound of the formula $RCONHCH_2OH$ wherein R is an alkyl radical containing from 6 to 11 carbon atoms and allowing the mixture to stand until the reaction is complete.

8. In a process of making pungent compounds, adding concentrated $H_2SO_4$ to an alcoholic solution of guaiacol and a compound of the formula $RCONHCH_2OH$ wherein R is an alkyl radical containing from 6 to 11 carbon atoms and allowing the mixture to stand until the reaction is complete.

9. In a process of making pungent compounds, adding a dehydrating agent to an alcoholic solution of guaiacol and a compound of the formula $RCONHCH_2OH$ wherein R is an alkyl radical containing from 6 to 11 carbon atoms, allowing the mixture to stand until the reaction is complete and extracting the pungent material from the reaction products by means of an organic solvent.

10. In a process of making pungent compounds, adding a dehydrating agent to an alcoholic solution of guaiacol and a compound of the formula $RCONHCH_2OH$ wherein R is an alkyl radical containing from 6 to 11 carbon atoms, allowing the mixture to stand until the reaction is complete and extracting the pungent material from the reaction products by means of $CHCl_3$.

DONALD B. BRADNER.
MARY L. SHERRILL.